United States Patent [19]
Sesselmann

[11] Patent Number: 6,134,718
[45] Date of Patent: *Oct. 24, 2000

[54] ODOR ABSORBING CLOTHING

[75] Inventor: Gregory J. Sesselmann, Muskegon, Mich.

[73] Assignee: ALS Enterprises, Inc., Muskegon, Mich.

[ * ] Notice: This patent is subject to a terminal disclaimer.

[21] Appl. No.: 09/365,364

[22] Filed: Jul. 30, 1999

Related U.S. Application Data

[63] Continuation of application No. 09/127,162, Jul. 31, 1998, which is a continuation of application No. 08/685,820, Jul. 25, 1991, Pat. No. 5,790,987, which is a continuation of application No. 08/373,588, Jan. 17, 1995, Pat. No. 5,539,930, which is a continuation of application No. 08/125,342, Sep. 22, 1993, Pat. No. 5,383,236, which is a continuation of application No. 07/798,288, Nov. 25, 1991, abandoned.

[51] Int. Cl.$^7$ .................................................. A41D 13/00
[52] U.S. Cl. ............................. 2/243.1; 2/1; 2/69; 2/457
[58] Field of Search ................................. 2/243.1, 69, 79, 2/455, 400, 402, 403, 901, 457; 428/196

[56] References Cited

U.S. PATENT DOCUMENTS

| | | | |
|---|---|---|---|
| 3,783,085 | 1/1974 | Pearson | 2/455 |
| 4,244,059 | 1/1981 | Pflaumer | 2/400 |
| 4,455,187 | 6/1984 | Von Blucher et al. | 156/277 |
| 4,510,193 | 4/1985 | Blucher et al. | 428/196 |
| 5,383,236 | 1/1995 | Sesselman | 2/243.1 |
| 5,539,930 | 7/1996 | Sesselman | 2/243.1 |
| 5,790,987 | 8/1998 | Sesselman | 2/243.1 |

FOREIGN PATENT DOCUMENTS

WO97/46878   12/1997   WIPO .

*Primary Examiner*—Gloria M. Hale
*Attorney, Agent, or Firm*—Foley & Lardner

[57] ABSTRACT

Articles of clothing adapted to be worn by and to substantially surround at least a portion of a person. The articles of clothing absorb odors emanating from that portion of the person which is substantially surrounded by the clothing preventing odors from escaping to the atmosphere.

27 Claims, 3 Drawing Sheets

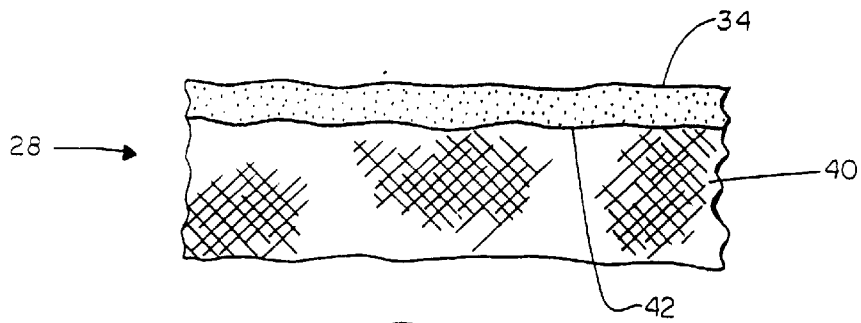
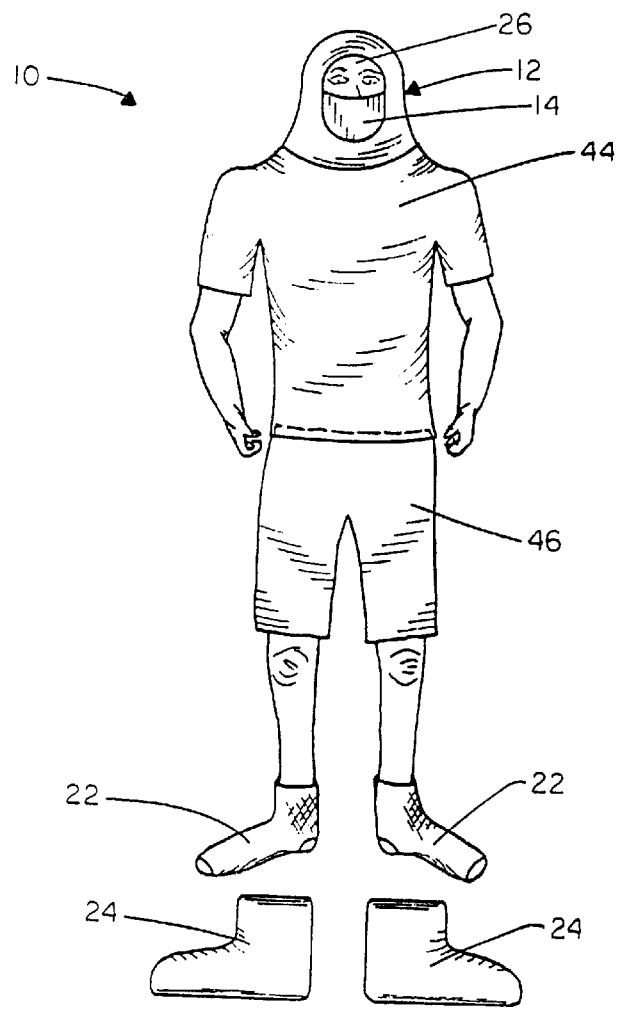

ODOR ABSORBING CLOTHING

This application is being filed as a continuation of current application Ser. No. 09/127,162 filed Jul. 31, 1998 which was a continuation of application Ser. No. 08/685,820, filed Jul. 25, 1991, now U.S. Pat. No. 5,790,987 issued Aug. 8, 1998 which was a continuation of U.S. application Ser. No. 08/373,588, filed Jan. 17, 1995, now U.S. Pat. No. 5,539,930, issued Jul. 30, 1996 which is a continuation of application Ser. No. 08/125,342, filed Sep. 22, 1993, now U.S. Pat. No. 5,383,236 issued Jan. 24, 1995 which is a continuation of application Ser. No. 07/798,288 filed Nov. 25, 1991, now abandoned.

BACKGROUND OF THE INVENTION

1. Field of the Invention

This invention relates to odor absorbing clothing and, more particularly, to a suit adapted to cover a portion or substantially the entire body of a person and absorb odors emanating from the person.

2. Description of the Related Art

It is an unavoidable occurrence that humans emanate odors. The odors may originate from numerous sources including natural bodily secretions such as perspiration, oils, and the like; halitosis; colognes, perfumes, scented soaps, deodorants, shampoos, and the like; clothing worn by the individual; and odors that are absorbed by the individual's clothing and subsequently released to the surrounding environment. That a person emanates odors is not necessarily reflective of his personal hygiene but is simply an unassailable fact of human existence.

Numerous cosmetic and health care products have been developed to mask the more unpleasant odors. Colognes, perfumes, scented soaps, deodorants and the like which are employed for such purposes do nothing more than mask the undesirable odor and replace it with one that is considered more pleasing. In certain situations, however, it is desirable to provide an odorless or scentless presence. For example, certain people must have the ability to approach wild game in close proximity. Such persons include hunters, naturalists, wildlife photographers, wildlife biologists, wildlife political activists, and law-enforcement personnel charged with the responsibility of protecting wild game from injury, poaching and the like.

It is well known that wild game have a keenly developed sense of smell that can readily distinguish odors that are not indigenous to their natural habitat. Such odors may include those emanating from humans who attempt to gain close proximity to the game. Perfumes, scented soaps, and colognes may mask odors but are themselves readily detected by the wild game, perhaps at even greater distances. Such scents are not natural to the animals and therefore they are either scared away or alerted to the presence of potential danger.

One attempt to mask these odors is found in hunter's aids in the form of sponge-like pads that can be repeatedly impregnated with an artificially or naturally based aromatic scent such as deer lure. Examples of such devices are disclosed in U.S. Pat. No. 4,186,502, issued Feb. 5, 1982 to L. Foster and U.S. Pat. No. 4,302,899, issued Dec. 1, 1981 to G. DeHart. These devices function by distributing a scent that wild game find attractive but they do nothing to mask or absorb the odors emanating from the person. With time, the attractive powers of the lure diminish thereby decreasing its effectiveness. Moreover, the wild game may sense both the attractant and the odors emanating from the person. These prior devices are not acceptable because they do nothing to eliminate the scents indigenous to humans.

There has been a long-felt need for some device that is adapted to readily, efficiently and effectively absorb human odors such that a user presents a virtually odorless or scentless appearance, thereby enabling one to approach wild game in close proximity.

SUMMARY OF THE INVENTION

This invention relates to articles of clothing adapted to be worn by and substantially surround at least a portion of a person, the articles comprising means for absorbing odors emanating from that portion of the person which is substantially surrounded by the clothing. The clothing articles may comprise inner and outer layers with the odor absorbing means being enclosed therebetween. The odor absorbing means may include an odor absorbing agent selected from the group consisting of activated charcoal, chlorophyll, baking soda, activated alumina, soda lime, zeolite, calcium oxide, potassium permanganate or a similar substance. The odor absorbing means may be in the form of a fabric layer having the odor absorbing agent incorporated therein, the fabric layer being received or enclosed between the inner and outer layers of the clothing article. The inner and outer layers of the clothing articles may be similar or dissimilar and may be selected from the group consisting of cotton, polypropylene, wool, felt, polyester or a laminate comprising polytetrafluoroethylene bonded to a suitable fabric. In another embodiment, the articles of clothing may be formed of a polymeric foam that is impregnated with the odor absorbing means.

Articles of clothing that may be constructed in accordance with the invention include a covering for the head, a covering for the upper body, a covering for the lower body, a covering for the hand, and a covering for the foot and boot. An article of clothing according to the invention may also comprise a body suit adapted to substantially envelop at least upper and lower body portions of a person. Similarly, articles such as backpacks, fanny packs and the like may incorporate odor absorbing means to absorb the odors of the articles inside.

BRIEF DESCRIPTION OF THE DRAWINGS

The invention will now be described with reference to the drawings in which:

FIG. 4 is a cross-sectional view through an article of clothing having a second alternative construction in accordance with the invention; and FIG. 5 is an elevational view of a person shown in conjunction with several articles of clothing constructed in accordance with the invention.

DESCRIPTION OF THE PREFERRED EMBODIMENT

Figure 1:
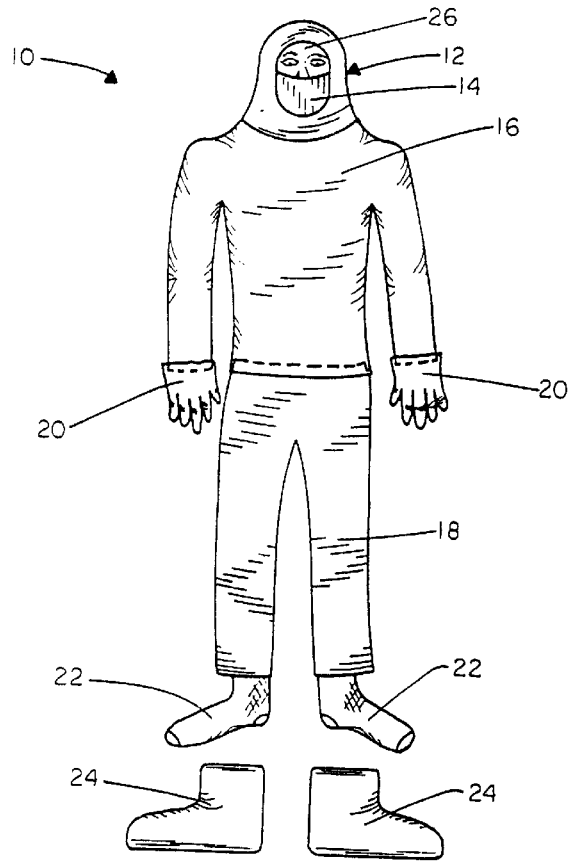
FIG. 1 is an elevational view of a person shown in conjunction with several articles of clothing in partially exploded array and constructed in accordance with the invention.

Turning now to the drawings and in particular to FIG. 1, a person 10 is shown in conjunction with several articles of clothing, each of which, as explained more fully below, when constructed in accordance with the invention is adapted to absorb odors emanating from the person. The particular articles of clothing illustrated in FIG. 1 include a head covering 12, a breath shield 14, an upper body or torso cover 16, a lower body cover 18, gloves or mittens 20, foot covers or socks 22, and boot or shoe covers 24. Similarly, articles such as backpacks, fanny packs and the like may incorporate odor absorbing means to absorb the odors of the materials stored therein.

The head covering 12 is adapted to substantially cover the entire head of the person 10 as well as the neck region. Preferably, an open portion 26 is provided in order that the person 10 may see. The breath shield 14 may be incorporated directly into the head covering 12 by stitching or adhesive bonding or may be in the form of a separate article of clothing similar to surgical masks and the like employed by physicians.

The upper body cover 16 is adapted to cover the torso and waist regions of the person 10 as well as the arms and shoulders. Similarly, the lower body cover 18 is adapted to cover the waist and pelvic regions 10 as well as the legs. The upper and lower body covers 16, 18 may comprise individual articles of clothing that overlap in the area of the waist or may be in the form of a one-piece body suit.

The gloves or mittens 20 may be worn over the hands and preferably overlap those portions of the upper body cover 16 that envelop the arms of the wearer. Similarly, the socks may be worn over the feet of the individual 10 and function as foot covers. Finally, the boot or shoe covers 24 commonly known as "gators" may be adapted to be worn over clad feet and may be provided with heels, soles or the like if desired.

The individual articles of clothing may be sized to conform to the person wearing the clothing although it is preferred that they be made large enough to be capable of being worn comfortably by a person dressed in otherwise conventional clothing. The individual articles of clothing may be thermally insulated or made water-repellent or water-resistant if desired although this is not required to successfully practice the invention. Similarly, the articles of clothing may be provided with an appropriate camouflaging color scheme so that the person 10 wearing clothing constructed according to the invention may blend more readily into the surrounding environment. Alternatively, it may be desired to provide the articles of clothing with a bright and highly visible color so that the person 10 will be easily observable by other people such as hunters.

Figure 2:
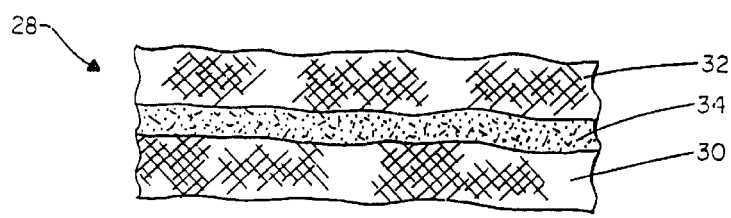
FIG. 2 is a cross-sectional view through an article of clothing constructed in accordance with the invention, showing the construction thereof in greater detail.
Figure 3:
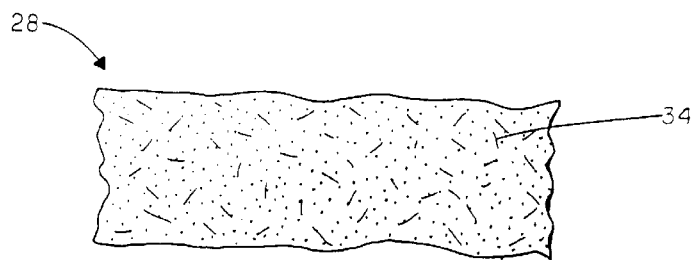
FIG. 3 is a cross-sectional view through an article of clothing having a first alternative construction in accordance with the invention.
Figure 6:
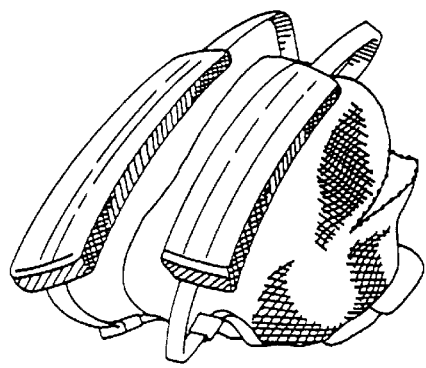
FIGS. 6–8 show other embodiments in accordance with the present invention.
Figure 7:
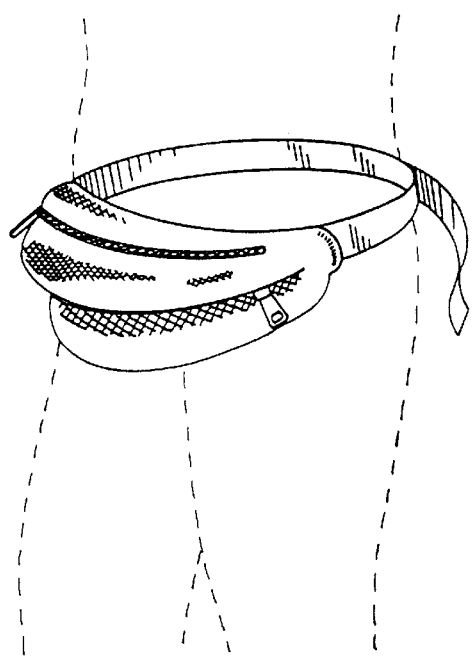
Figure 8:
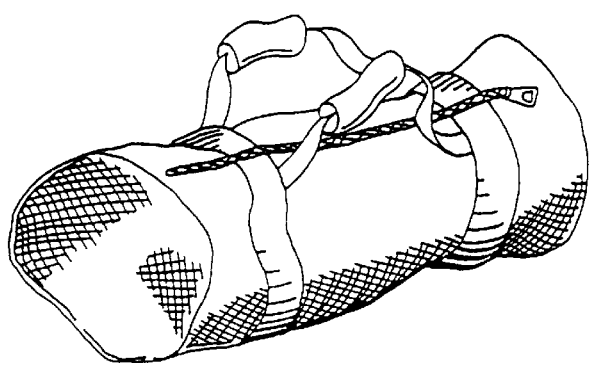

Each of the articles of clothing identified above has a substantially similar construction in cross section, which construction is shown in greater detail in FIGS. 2–4. To assist the description hereinafter, the reference numeral 28 in FIGS. 2–4 identifies an article of clothing generally. It will be understood that the article of clothing identified generally in FIGS. 2–4 by the reference numeral 28 may comprise any of the articles of clothing described hereinabove including the head covering 12, the breath shield 14, the upper body cover 16, the lower body cover 18, the gloves, mittens or hand covers 20, the socks or foot covers 22, the boot or shoe covers 24, or a duffle or knapsack (not shown).

In the embodiment illustrated in FIG. 2, the article of clothing 28 comprises an inner layer 30 and an outer layer 32 having enclosed therebetween means 34 for absorbing odors of the wearer. The odor absorbing means 34 may be in the form of fibers treated with or having incorporated therein activated carbon or charcoal. A suitable example of such odor absorbing means is commercially marketed under the name Garfil-615 by Purification Products Ltd. of Great Britain and distributed in the United States by Filter-X, Inc. of Harrisburg, Pa. Preferably, the amount of activated charcoal is in the range of 5 g/m$^2$ to 120 g/m$^2$. Alternatively, the odor absorbing means could be in the form of chlorophyll, baking soda, activated alumina, soda lime, zeolite, calcium oxide, potassium permanganate or a similar substance.

The inner and outer layers 30, 32 of the clothing article 28 may be similar or dissimilar and may comprise cotton, polypropylene, wool, felt, polyester, TYVEK® or GORE-TEX®, a laminate comprising polytetrafluoroethylene bonded to a suitable fabric and commercially marketed by W. L. Gore & Associates, Inc., Newark, Del. The various materials for the inner and outer layers 30, 32 may be, non-woven, closely woven, comprise a fine mesh or be fabricated in some other suitable manner. The inner and outer layers 30, 32 may be secured to each other by stitching, quilting, needling or adhesive bonding at appropriate and conventional locations (not shown separately in the drawings) such as seams.

In one embodiment, the inner and outer layers 30, 32 may be in the form of a needled, non-woven polyester fabric, each layer having a weight of approximately 10 to 12 oz./sq. yd. and a thickness of approximately 1⁄16". The odor absorbing means may be provided by a layer of Garfil-615 having a weight of approximately 10–12 oz./sq. yd.

Alternatively, as best shown in FIG. 3, the article of clothing 28 may be in the form of a foam of latex or other polymer 36 that has been impregnated with the odor absorbing means 34, such as activated charcoal. Whatever materials are selected for the ultimate construction of the article of clothing 28, the article should preferably be durable, flexible, abrasion resistant, easy to manufacture, nontoxic, nonflammable, and capable of carrying or retaining substantial amounts of the appropriate odor absorbing means 34.

A further embodiment of the article of clothing is seen in FIG. 4. In this embodiment, a base material 40 has a layer of odor absorbing means 34 bonded to a first surface 42. Preferably, the layer of odor absorbing means 34 is mounted on the outer surface of the base material, although mounting the odor absorbing means on the inner surface of the base material is acceptable. The odor absorbing means 34 may be mounted on the base material 40 by a "printing" process wherein the odor absorbing substance, such as activated charcoal, is mixed with a bonding agent and then printed on the base material 40 by a silk-screen printing process. An example of this process is disclosed in U.S. Pat. No. 4,510,193 to Blucher et al., issued Apr. 9, 1985.

The person 10 may choose to wear some or all of the articles of clothing described above and illustrated in FIG. 1. The degree of odor absorption increases as the surface area of the body of the person 10 covered by the articles of clothing increases. Thus, the most effective odor absorbing arrangement will comprise the head covering 12, the breath shield 14, the upper body cover 16, the lower body cover 18, the gloves or mittens 20, the socks or foot covers 22, and the boot or shoe covers 24. Although effective odor absorption may be realized by wearing only some of the articles of clothing, the person 10 will preferably wear all of the articles of clothing described above to provide a more-or-less total-coverage body suit.

In warm weather climates, it may be desirable to cover only a portion of the person 10. FIG. 5 shows an alternative embodiment of the suit according to the invention. In this embodiment, the person 10 wears an upper body cover 44 and a lower body cover 46. The upper body 44 cover is analogous to a short-sleeve shirt wherein the person's chest, torso, shoulders and underarms are covered. The lower body cover 46 comprises a pair of shorts which cover the pelvic or groin region and a portion of the legs of the person 10. The embodiment seen in FIG. 5 may be enhanced by adding one or more of the head covering 12, the breath shield 14, the gloves 20, the foot covers 22 or the shoe covers 24.

It may be desirable to provide additional odor absorbing means 34 for those articles of clothing adjacent to body parts that are more likely to emanate readily detectable odors such as the underarms and pelvic regions. In this case, an enhanced layer of the odor absorbing means can be mounted to the article of clothing 28 in the underarm or pelvic regions. For example, two layers of activated charcoal in the amount of 50 g/m$^2$ may be mounted one on top of the other to create a total of 100 g/m$^2$ for enhanced odor absorption in one or more sensitive areas.

The articles of clothing according to the invention may be worn as an outer layer of clothing, as an inner layer, or intermediate outer and inner layers of otherwise conventional clothing.

It has been found that activated charcoal used as the odor absorbing means 34 may be reactivated for numerous cycles of use. This reactivation can occur merely by washing and drying the article of clothing 28. Washing and drying helps to remove impurities and foreign articles bonded to the activated charcoal.

Reasonable variations or modifications are possible within the spirit of the foregoing specification and drawings without departing from the scope of the invention which is defined in the accompanying claims.

The embodiments of the invention in which an exclusive property or privilege is claimed are defined as follows:

1. At least one article of clothing comprising an upper body portion adapted to cover at least the torso region of a person wearing said at least one article of clothing, said at least one article of clothing having a base layer with an interior surface, and an exterior surface opposite said interior surface, and an agent adapted to reduce naturally occurring odors emanating from the body of a person wearing the at least one article of clothing, said agent being provided in the base layer and selected from the group consisting of activated charcoal, chlorophyll, baking soda, activated alumina, soda lime, zeolite, calcium oxide, and potassium permanganate.

2. At least one article of clothing according to claim 1 wherein said upper body portion is adapted to cover the shoulders and at least a portion of the arms of a person wearing said at least one article of clothing.

3. At least one article of clothing according to claim 1 and further comprising a lower body portion adapted to cover the waist and pelvic regions of a person wearing said at least one article of clothing.

4. At least one article of clothing according to claim 3 wherein said lower body portion is adapted to cover at least a portion of the legs of a person wearing said at least one article of clothing.

5. At least one article of clothing according to claim 4 wherein said at least one article of clothing comprises a one-piece body suit.

6. At least one article of clothing according to claim 1 wherein said at least one article of clothing is adapted to be worn as the outermost layer of clothing of a person wearing said at least one article of clothing.

7. At least one article of clothing according to claim 6 and further comprising a camouflage color scheme provided on at least a portion of said exterior surface.

8. At least one article of clothing according to claim 6 and further comprising a bright, highly visible color scheme provided on at least a portion of said exterior surface.

9. At least one article of clothing according to claim 1 and further comprising a camouflaging color scheme provided on at least a portion of said exterior surface.

10. At least one article of clothing according to claim 9 wherein said at least one article of clothing is adapted to substantially surround the torso, waist, and pelvis of a person wearing said at least one article of clothing.

11. At least one article of clothing according to claim 1 and further comprising a bright, highly visible color scheme is provided on at least a portion of said exterior surface.

12. At least one article of clothing according to claim 11 wherein said at least one article of clothing is adapted to substantially surround the torso, waist, and pelvis of a person wearing said at least one article of clothing.

13. At least one article of clothing according to claim 12 wherein at least one of said inner and outer layers of said article are formed of a material selected from the group consisting of cotton, polypropylene, wool, felt, polyester, and a laminate comprising polytetrafluoroethylene bonded to a fabric.

14. At least one article of clothing according to claim 1 and further comprising a head covering adapted to substantially cover at least one of the scalp and mouth of a person wearing said at least one article of clothing.

15. At least one article of clothing according to claim 1 wherein the article of clothing is water-repellent.

16. At least one article of clothing according to claim 1 wherein the article of clothing is water-resistant.

17. At least one article of clothing comprising an upper body portion adapted to cover at least one of the torso region and the groin region of a person wearing said at least one article of clothing said at least one article of clothing having a base layer with an interior surface, an exterior surface opposite said interior surface, and a camouflage color scheme provided on at least a portion of the at least one article of clothing, and an agent adapted to reduce naturally occurring odors emanating from the body of a person wearing the at least one article of clothing, said agent being provided in the base layer and selected from the group consisting of activated charcoal, chlorophyll, baking soda, activated alumina, soda lime, zeolite, calcium oxide, and potassium permanganate.

18. At least one article of clothing according to claim 17 wherein said at least one article of clothing comprises a coat and a pair of pants.

19. At least one article of clothing according to claim 17 wherein said at least one article of clothing is adapted to be worn as the outermost layer of clothing of a person wearing said at least one article of clothing.

20. At least one article of clothing according to claim 17 wherein the article of clothing is water-repellent.

21. At least one article of clothing according to claim 17 wherein the article of clothing is water-resistant.

22. At least one article of clothing comprising an upper body portion adapted to cover at least one of the torso region and groin region of a person wearing said at least one article of clothing, said at least one article of clothing having an air permeable base layer with an interior surface and an exterior surface opposite said interior surface, and an agent adapted to reduce naturally occurring odors emanating from the body of a person wearing the at least one article of clothing, said agent being provided in the base layer and selected from the group consisting of activated charcoal, chlorophyll, baking soda, activated alumina, soda lime, zeolite, calcium oxide, and potassium permanganate.

23. At least one article of clothing according to claim 22 wherein said at least one article of clothing is adapted to be worn as the outermost layer of clothing of a person wearing said at least one article of clothing.

24. At least one article of clothing according to claim 23 wherein said at least one article of clothing comprises a one piece body suit.

25. At least one article of clothing according to claim 23 and further comprising a head covering adapted to substantially cover at least one of the scalp and mouth of a person wearing said at least one article of clothing.

26. At least one article of clothing according to claim 23 wherein the article of clothing is water-repellent.

27. At least one article of clothing according to claim 23 wherein the article of clothing is water-resistant.

* * * * *